(12) United States Patent
Isfort

(10) Patent No.: US 7,798,894 B2
(45) Date of Patent: Sep. 21, 2010

(54) METHOD FOR TRANSFERRING CROP MATERIAL

(75) Inventor: Heinrich Isfort, Duelmen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 279 days.

(21) Appl. No.: 11/501,587

(22) Filed: Aug. 9, 2006

(65) Prior Publication Data

US 2007/0037621 A1 Feb. 15, 2007

(30) Foreign Application Priority Data

Aug. 12, 2005 (DE) .................... 10 2005 038 553

(51) Int. Cl.
*A01D 17/02* (2006.01)

(52) U.S. Cl. .................... 460/114; 56/13.3; 56/16.6

(58) Field of Classification Search ............... 460/114, 460/119; 56/12.8, 13.3, 16.4 R, 16.6
See application file for complete search history.

(56) References Cited

U.S. PATENT DOCUMENTS 1,402,724 A * 1/1922 Stukenborg ................ 56/13.2
5,749,783 A * 5/1998 Pollklas ..................... 460/119
5,953,892 A * 9/1999 Albicker et al. ............... 56/71
5,979,151 A * 11/1999 Sanders et al. ................ 56/60
6,012,272 A * 1/2000 Dillon ....................... 56/14.6
6,097,425 A * 8/2000 Behnke et al. ............... 348/89
6,594,979 B2 * 7/2003 Krone et al. ................ 56/16.6

FOREIGN PATENT DOCUMENTS

EP 1 380 204 1/2004

* cited by examiner

*Primary Examiner*—Alicia M Torres
(74) *Attorney, Agent, or Firm*—Michael J. Striker

(57) ABSTRACT

In a method for transferring crop material from a harvesting machine to a hauling vehicle, with which the crop material is accelerated and ejected through a conveyor chute of a transfer device to a target point on the transport vehicle, the acceleration of the crop material to be transferred is controlled as a function of at least one parameter that represents a transfer distance. A corresponding control unit for a harvesting machine and a harvesting machine with a control unit of this type is also provided.

12 Claims, 4 Drawing Sheets

METHOD FOR TRANSFERRING CROP MATERIAL

CROSS-REFERENCE TO A RELATED APPLICATION

The invention described and claimed hereinbelow is also described in German Patent Application DE 10 2005 038 553.2 filed on Aug. 12, 2005. This German Patent Application, whose subject matter is incorporated here by reference, provides the basis for a claim of priority of invention under 35 U.S.C. 119(a)-(d).

BACKGROUND OF THE INVENTION

The present invention relates to a method for transferring crop material from a harvesting machine to a hauling vehicle, with which the crop material is accelerated and ejected through a conveying shaft of a transfer device to a target point on the transport vehicle.

The present invention also relates to a corresponding control unit for a harvesting machine, and a harvesting machine, in particular a forage harvester, with a transfer device and a control unit of this type.

Self-propelled harvesting machines, such as forage harvesters, combine harvesters or the like typically include a transfer device, e.g., with an upper discharge chute or a grain tank unloading tube, with which the crop material is transferred from the harvesting machine to a transport vehicle. When the harvested crop material is to be transferred continually during the harvesting operation, as is typically the case with a forage harvester, for example, the transport vehicle must be driven parallel alongside or behind the harvesting machine during the harvesting operation. To this end, a part of the conveyor chute of the transfer device that is attached to the outside of the machine—i.e., the upper discharge chute on a forage harvester—can be positioned by swiveling it around the vertical and horizontal axes such that the ejected or outflowing stream of crop material strikes the desired target point on the transport vehicle.

The transport vehicle typically must be driven behind the forage harvester the first time a forage harvester drives onto the field to be harvested, because there is no space next to it for the transport vehicle. As soon as a first track in the field has been harvested, the transport vehicle can be driven next to the forage harvester. Depending on the particular position of the transport vehicle relative to the harvesting machine, the transfer distance, i.e., the distance between the harvesting machine and the target point on the transport vehicle struck by the stream of crop material, naturally varies. Depending on the transfer distance, the crop material sometimes must be ejected less far and sometimes further out of the conveyor chute. When the transport vehicle is driven next to the harvesting machine, it is sufficient, e.g., for the crop material to simply fall downward out of the conveyor chute, since the conveyor chute typically extends over the transport vehicle. If the transport vehicle is driven behind the harvesting machine, however, a relatively long distance from the discharge end of the conveyor chute to the target point on the transport vehicle must be covered, e.g., to pass over a tractor that pulls a hauling trailer. A relatively rapid, "piercing" stream of crop material is ejected from the conveyor chute, so that the relatively lightweight crop material reaches the target point without significant losses and without being scattered by the wind and lost. To bring the crop material up to the necessary speed, it must be accelerated accordingly. This acceleration is carried out anyway by the processing units, e.g, in the case of a forage harvester, the chopper drum and any conditioning devices that may be present, such as the corn cracker. These working units simultaneously serve to convey the flow of crop material inside the harvesting machine at a certain speed. The speed attained by the working units is typically not adequate to convey the crop material through the conveyor chute and, in particular, over a long distance through the air as a fast-moving stream of crop material. Forage harvesters, for example, are therefore typically equipped with a post-accelerating device located in the entrance to the conveyor chute or directly in front of the conveyor chute.

An example of a post-accelerating device of this type is described in EP 1 380 204 A1. In a post-accelerating device of this type, the crop material is always accelerated to a speed that enables it to be transported out of the conveyor chute and through the air, even over a long distance. The exact trajectory is set by adjusting the height of the upper discharge chute and by adjusting a discharge flap located on the end of the upper discharge chute, by way of which the ejected stream of crop material is pointed in the desired direction toward the target point. A relatively great deal of energy is used to further accelerate the crop material.

SUMMARY OF THE INVENTION

Accordingly, it is an object of the present invention to provide a method of transferring crop material, which is a further improvement of the inventive methods.

More particularly, it is an object of the present invention to provide a method for transferring crop material from a harvesting machine to a transport vehicle, and a corresponding control unit for a harvesting machine, and a harvesting machine with a control unit of this type that increases the energy efficiency of the transfer.

In keeping with these objects and with others which will become apparent hereinafter, one feature of the present invention resides, briefly stated, in a method for transferring crop material from a harvesting machine to a hauling vehicle, comprising accelerating the crop material and ejecting through a conveyor chute of a transfer device to a target point on a transport vehicle; and controlling the acceleration of the crop material to be transferred as a function of at least one parameter that represents a transfer distance.

Another feature of the present invention, resides, briefly stated, in a control unit for a harvesting machine, including a transfer device for transferring crop material from the harvesting machine to a transport vehicle; a device to accelerate the crop material and eject it through a conveyor chute of the transfer device to a target point on the transport vehicle, wherein said control unit is configured such that an acceleration of the crop material to be transferred is controlled as a function of at least one parameter that represents a transfer distance.

Still a further feature of the present invention, resides, briefly stated, in a harvesting machine, comprising a transfer device; and a control unit including a transfer device for transferring crop material from the harvesting machine to a transport vehicle; a device to accelerate the crop material and eject it through a conveyor chute of the transfer device to a target point on the transport vehicle, wherein said control unit is configured such that an acceleration of the crop material to be transferred is controlled as a function of at least one parameter that represents a transfer distance.

According to the present invention, it is ensured that—in deviation from common practice, according to which the crop material is always accelerated to the highest speed possible—the acceleration of the crop material to be transferred is controlled as a function of at least one parameter that represents a transfer distance. In this manner it can be ensured that, if the transfer distance is very great, the crop material will be accelerated to a high speed as usual, so that the target point is reached by the stream of crop material without significant loss. In transfer situations in which the crop material only needs to "fall out" of the conveyor chute, however, it is no longer necessary to greatly accelerate the crop material and expend excess energy for this purpose. This is attractive, in particular, because—as described initially—the transport vehicle is rarely driven behind the harvesting machine, so that a large transfer distance rarely needs to be covered. In most cases, however, i.e., whenever the transport vehicle is driven next to the harvesting machine, the transfer distance to be covered is short. As a result, a considerable amount of energy can be saved during a majority of the harvesting time using the method according to the present invention.

The present invention is particularly advantageously suited for use with forage harvesters, since, in this case, the crop material is typically ejected immediately toward a transport vehicle being driven alongside. It is also possible, however, to use the method according to the present invention when transferring the crop material from harvesting machines to a grain tank.

A control unit designed according to the present invention can be realized preferably in the form of software on an arithmetic unit, e.g., in a typical control processor of the harvesting machine.

In one exemplary embodiment, the acceleration of the crop material to be transferred is controlled by controlling at least one parameter of a material processing unit of the harvesting machine, e.g., in the case of a forage harvester, the chopper drum or a downstream conditioning device, with consideration for the applicable parameter, which represents the transfer distance. That is, these parameters are not only controlled via the crop material throughput or ground speed, etc., as usual, but the transfer distance is also taken into consideration.

With a particularly preferred exemplary embodiment, the crop material is accelerated further in a separate feed device, however. According to the present invention, this feed device is then controlled as a function of the particular parameter, which represents the transfer distance. The feed device is preferably a post-accelerating unit located in the conveyor chute, preferably on the input side, e.g., a post-accelerating drum. As an alternative, this post-accelerating device is also located directly in front of the entrance to the conveyor chute. Particularly preferably, the post-accelerating unit is movable inside a machine housing of the post-accelerating unit, e.g., in the conveyor chute, thereby enabling a gap width between the post-accelerating unit and a wall of the machine housing to be adjusted. A post-accelerating device installed in this manner is described in EP 1 380 204 A1, which was cited initially. The acceleration of the crop material achieved via the post-accelerating unit can be controlled by adjusting the gap width.

As an alternative or in addition, the acceleration of the crop material can also preferably be controlled by controlling the speed of the post-accelerating unit.

A further preferred possibility for controlling the acceleration of the crop material attained by the post-accelerating unit is to control the setting of impeller blades of the post-accelerating unit.

A further alternative is to control the air supply through the post-accelerating unit. With conventional forage harvesters, air is drawn in by the post-accelerator through ventilation openings located on the front ends of the post-accelerating drum and, as a result, air is injected into the flow of crop material. With a preferred exemplary embodiment of the present invention, it is now provided that the width of the air supply openings is adjustable in a stepped or continual manner, so that the quantity of air injected by the post-accelerator into the flow of crop of material can be regulated in a targeted manner. Preferably, this adjustment of the air supply openings can take place automatically with the aid of suitable adjusting elements.

With a particularly preferred exemplary embodiment, the acceleration of the crop material is also controlled as a function of harvesting parameters and/or crop material properties. The harvesting parameters includes, e.g., the crop material throughput, which is coupled with the particular quantity of crop material to be ejected. Other harvesting parameters include the ground speed and, optionally, ambient conditions such as the wind to which the crop material is exposed at it travels from the discharge end of the conveyor chute to the target point. The crop material properties include, in particular, the moisture level in the crop material and the density of the crop material. It is possible not only to control the extent of the acceleration as a function of the crop material properties, but also the manner in which the acceleration is carried out. It makes sense, e.g., when the crop material is dry, to attain acceleration by supplying more air, since dry crop material is lightweight and not as dense, which allows it to be easily conveyed using supplied air. In contrast, when the crop material is relatively moist and, therefore, heavy, or if the crop material is denser, the impeller blade position and the speed of the post-accelerating device should be regulated such that the material is accelerated by the impeller blades, since moist, dense crop material is easier to throw.

Highly diverse parameters can be used as the parameters that represent a transfer distance.

It is possible, e.g., to measure the transfer distance directly more or less exactly. This can be carried out, e.g., using sensors, a camera or the like that are located on the harvesting machine—on the discharge end of the conveyor chute, in particular—and by processing the data measured therewith accordingly. With a further, particularly convenient example, the harvesting machine and the transport vehicle are equipped with position-determination devices, e.g., GPS or Galileo receivers, in order to thereby determine the absolute positions of the two vehicles within a specified coordinate system and to calculate the transfer distance based thereon.

Since, with most harvesting machines, at least one part of the conveyor chute, e.g., the upper discharge chute in the case of a forage harvester, still must be positioned anyway such that the crop material reliably strikes the desired target point on the transport vehicle, the position of the related part of the conveyor chute is used as a measure of the transfer distance in a particularly preferred exemplary embodiment. Provided that the conveyor chute includes a movably located discharge flap on a discharge end to determine the throwing direction— as is the case with a typical upper discharge chute—the crop material is also accelerated as a function of the position of the discharge flap.

The advantage of using the positions of the conveyor chute part and the discharge flap is that these positions are known anyway or they are already measured by sensors located on the harvesting machine and, as a result, no further expenditure is required to determine the transfer distance.

With a preferred exemplary embodiment, the crop material to be transferred is accelerated as a function of the relevant parameter(s) in a stepped manner, i.e., there is a plurality of acceleration stages.

With a particularly simple exemplary embodiment, there are only two acceleration stages. In a first acceleration stage, the crop material is accelerated to a maximum speed, as is typical with harvesting machines. Transfer is carried out at this stage of acceleration if the crop material must be conveyed across a long transfer distance, e.g., toward the back over a tractor and into a hauling trailer. In this case, the post-accelerating unit, for example, is therefore controlled as usual (at the highest level of performance). In a second acceleration stage, however, the post-accelerating unit is not used at all to accelerate the crop material. In this case, acceleration is therefore carried out only by the crop material processing units themselves. The post-accelerating unit is either moved using suitable adjusting devices into a position in which it does not hinder the crop material at it travels from a working unit to the conveyor chute, or it travels along with the crop material at the crop material speed that already prevails in this region. This stage is activated, e.g., when the transport vehicle is very close to the harvesting machine, i.e., if the transfer distance to be covered is short.

It is also possible, of course, to also provide intermediate stages or to control the acceleration according to any function, always as a function of the transfer distance or as a function of the parameter(s) that represent the transfer distance.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
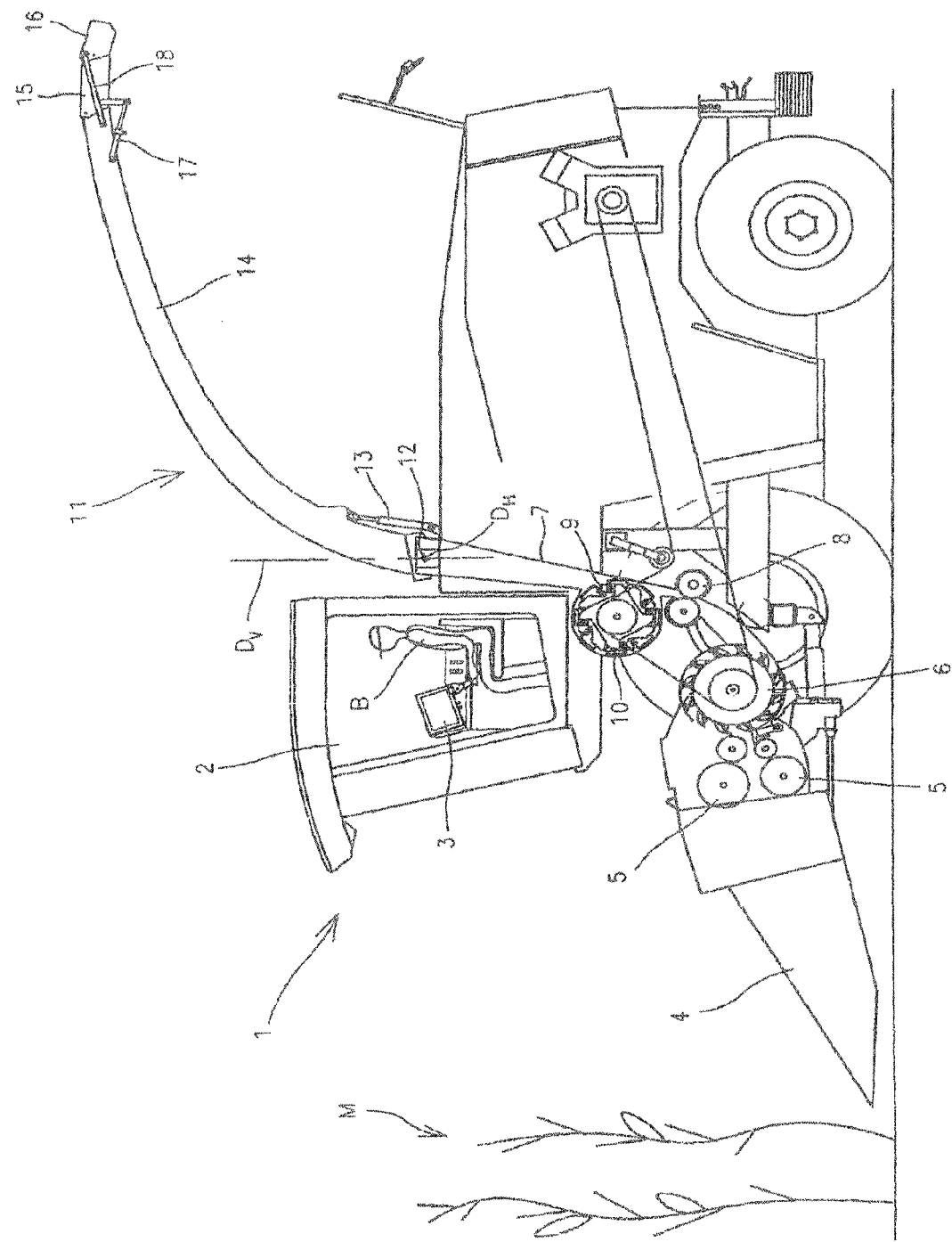
FIG. 1 shows a schematic cross section through a forage harvester.
Figure 2:
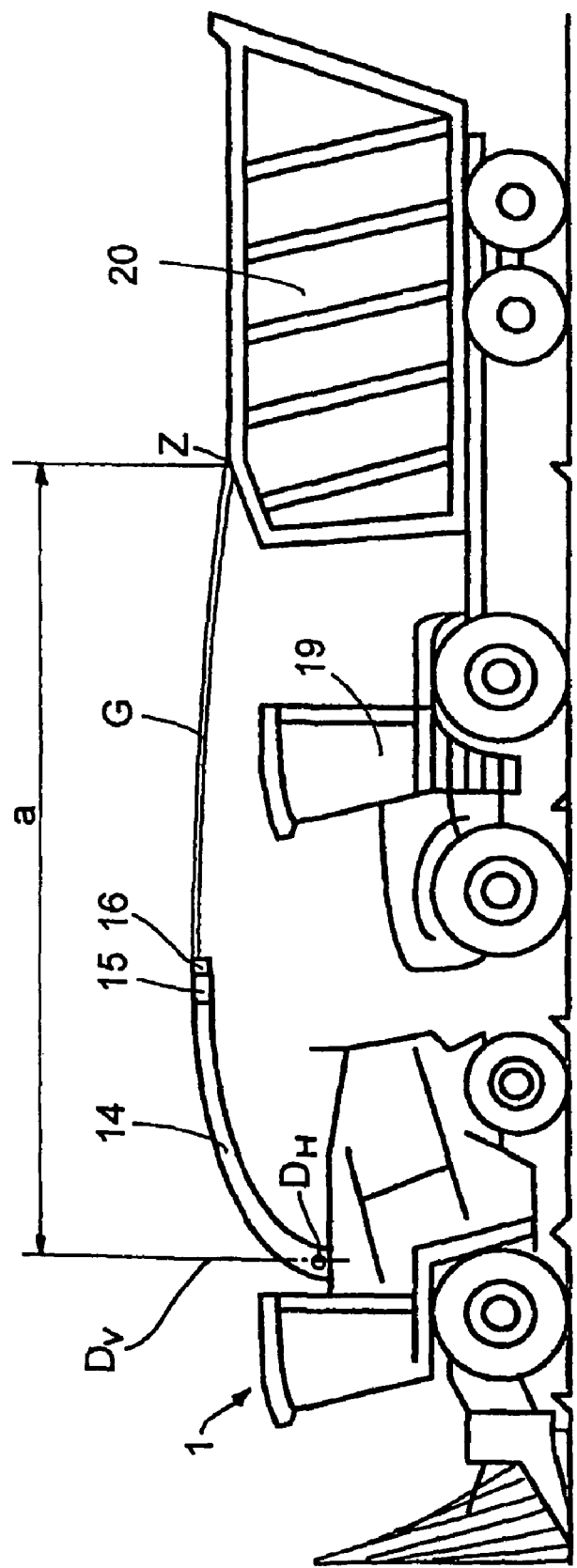
FIG. 2 shows a schematic side view of a forage harvester during transfer of crop material to a hauling vehicle being pulled by a tractor behind the forage harvester.
Figure 3:
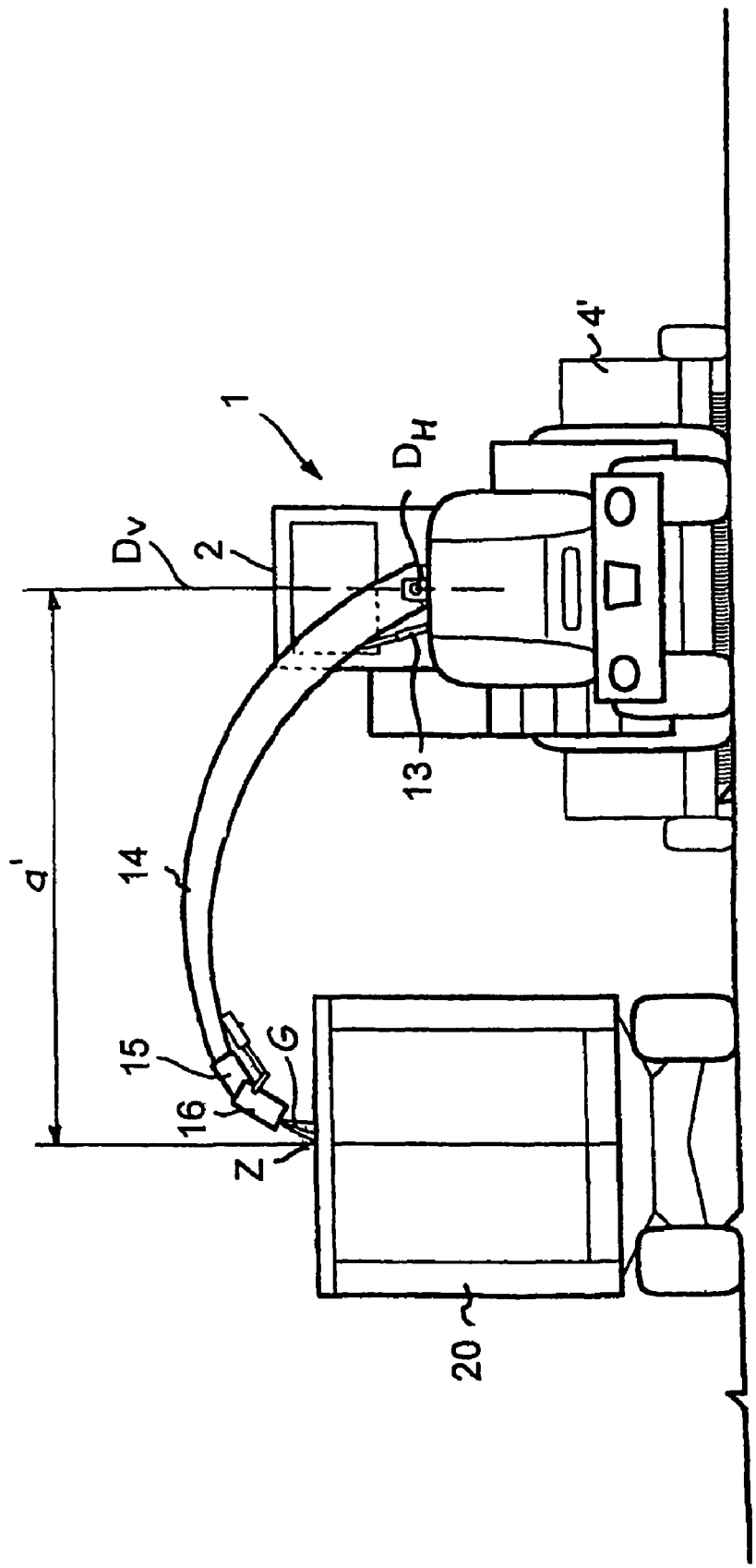
FIG. 3 shows a rear view of a forage harvester with a trailer being driven next to the forage harvester.

With the exemplary embodiments depicted in FIGS. 1 through 3, the harvesting machine is a forage harvester.

In FIG. 1, this forage harvester is equipped with a corn header 4 as a front attachment that cuts the corn M to be harvested at the bottom and then conveys it via feed drums 5 to a chopper drum 6. In this chopper drum 6, the corn plants are chopped in small pieces to a desired length of cut and guided further to a conditioning device 8, a "corn cracker" 8, that ensures that the corn kernels are cracked. Corn cracker 8 conveys crop material G further upward into a conveyor chute 7, in which a post-accelerating drum 9 is located on the input side. Crop material G is post-accelerated by rotating post-accelerating drum 9 and ejected via transfer device 11 to a transport vehicle 20 (see FIGS. 2 and 3).

In this case, transfer device 11 is composed of an upper discharge chute 14 that abuts conveyor chute 7, upper discharge chute 14 forming an extended, movable conveyor chute 14. As is typical with forage harvesters, this upper discharge chute 14 is located on harvesting machine 1 such that it can swivel with the aid of a flange joint around a vertical axis of rotation $D_V$, in order to swivel upper discharge chute 14 to the right or left sides, or toward the rear. Upper discharge chute 14 is also fastened to forage harvester 1 using hinges such that it can be pivoted in the air around a horizontal axis of rotation $D_H$. The height can be adjusted automatically using an adjusting cylinder 13.

A two-part discharge flap 15, 16, the individual elements of which are each adjustable using actuators 17, 18, is located on the of upper discharge chute 14. The trajectory and range of crop material G ejected out of upper discharge chute 14 can be determined by adjusting this discharge flap 15, 16 and via the vertical pivoting of upper discharge chute 14.

Post-accelerating device 9 is designed as a rotating post-accelerating drum 9 in this case. The speed of post-accelerating drum 9 is adjustable. The gap between post-accelerating drum 9 and the housing wall of conveyor chute 7—through which crop material G is guided—is also adjustable using a suitable adjusting mechanism. The position of impeller blades 10 attached to post-accelerating drum 9 can also be adjusted. The air supply can be controlled by post-accelerating drum 9 using (not-shown) air supply openings located in the front in the housing walls of the machine housing of post-accelerating drum 9, and the opening width of which is automatically adjustable.

All working units, feed units and adjusting units can be controlled by an operator B, located in a cab 2 of the forage harvester, using a user interface 3.

Different transfer situations are shown in FIGS. 2 and 3. FIG. 2 shows the situation in which crop material G is directed out of upper discharge chute 14 toward the rear over a tractor 19 and into a hauling vehicle 20 being pulled by a tractor 19. In this situation, transfer distance a from harvesting machine 1 to target point Z on hauling vehicle 20 is very great, i.e., crop material G must be directed over a relatively wide path in a rapid, concentrated stream.

In this case, transfer distance a is defined as the distance between the point defined by vertical axis of rotation $D_V$ of upper discharge chute 14 and target point Z of crop material stream located in a defined horizontal plane of impact, e.g., within the plane specified by the liftover height of hauling vehicle 20. The transfer distance can also be defined in any other manner. The only decisive aspect is the fact that this specifies the distance across which crop material G must be conveyed from harvesting machine 1 to target point Z on hauling vehicle 20.

FIG. 3 shows another extreme situation, in which hauling vehicle 20 is being pulled relatively close beside forage harvester 1. In this case, transfer distance a' is so short that the discharge end of upper discharge chute 14 is located directly above target point Z, so that crop material G need only "fall out of" the end of upper discharge chute 14, and it can be ejected at a relatively slow rate of speed.

In FIG. 3, forage harvester 1 is equipped not with a corn header but with a pick-up attachment 4' that continually collects grass swaths. This grass is chopped in forage harvester 1 with the aid of chopper drum and then ejected immediately via upper discharge chute 14 toward hauling vehicle 20. When used in this manner to collect grass and chaff of grass swaths, a conditioning device 8 is not required, in contrast to the exemplary embodiment shown in FIG. 1. Conditioning device 8 is therefore detached from forage harvester 1 in advance or is automatically moved into a position in which it does not affect the crop material.

As revealed by comparing FIGS. 2 and 3, to be ejected toward the rear and over a tractor 19, crop material G must be accelerated to a much greater extent than would be required, e.g., if it were ejected into a hauling vehicle being driven along the side. The trajectories of ejected crop material G are also entirely different; the trajectories are determined by a suitable vertical positioning of upper discharge chute 14 and the appropriate adjustment of discharge flap 15, 16 at the end of upper discharge chute 14. While discharge flap 15, 16 shown in FIG. 2 is adjusted such that it extends straight from upper discharge chute 14, to achieve the longest possible throw, discharge flap 15, 16 is tilted downward for transferring to a hauling vehicle 20 being driven along the side.

The horizontal position of upper discharge chute 14—i.e., whether it is a discharge position to the side or to the rear—and the vertical position of upper discharge chute 14, and the position of discharge flaps 15, 16 represent hereinbelow transfer distance a that must be covered by crop material G. In order to work in the most energy-efficient manner possible, the acceleration of crop material G in forage harvester 1 is regulated as a function of these parameters.

Figure 4:
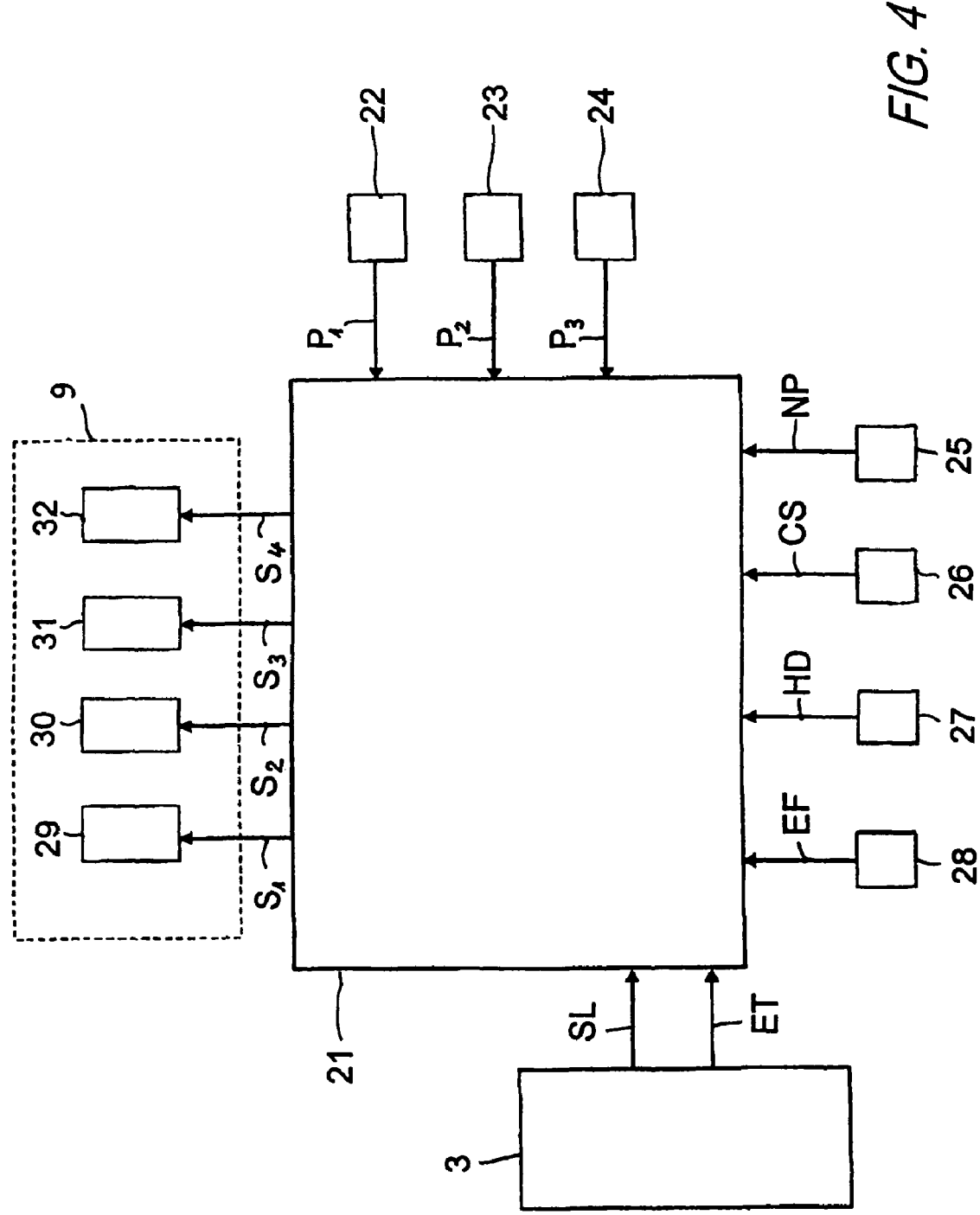
FIG. 4 shows a schematic depiction of an exemplary embodiment of a control unit according to the present invention.

One possible exemplary embodiment of a suitable control unit 21 is shown in FIG. 4 as a basic schematic illustration. Control unit 21 itself is depicted as a simple block that receives, as input variables, position data $P_1$ regarding the horizontal positioning of upper discharge chute 14—this data being received from a first position sensor 22—and, via a second position sensor 23, position data $P_2$ regarding the vertical position of upper discharge chute 14. Via a further position sensor 24, control unit 21 receives position data $P_3$ regarding discharge flap 15, 16. Based on this position data $P_1$, $P_2$, $P_3$, control unit 21 estimates transfer distance a. Alternatively, control unit 21 can also determine the position data in another manner, of course. For example, when the various actuators 12, 17, 18 of upper discharge chute 14 and discharge flap 15, 16 are controlled via the same control unit, these control data can also be applied immediately.

From a post-accelerator position sensor 25, control unit 21 receives further input data in the form of position data NP of post-accelerator 9 in conveyor chute 7, i.e., data regarding the gap width between post-accelerating drum 9 and the adjacent wall of the conveyor chute.

Furthermore, data CS regarding the corn cracker status is sent from corn cracker sensor 26 to control unit 21. Data CS indicates whether a corn cracker or a similar conditioning device inside forage harvester 1 is being used or not. Via a further speed sensor 27, control unit 21 receives data HD regarding the chopper drum speed and, via a crop moisture level sensor 28, it receives information EF regarding the moisture level in the crop material. In addition, the operator can specify information ET regarding the crop type and information SL regarding the length-of-cut setting.

Based on these data, control unit 21 calculates the extent to which post-acceleration of the crop material is even required and then adjusts various adjusting devices 29, 30, 31, 32 of post-accelerating device 9 with the aid of control signals $S_1$, $S_2$, $S_3$, $S_4$. Control signal $S_1$ is sent to an adjusting device 29 to adjust the position of impeller blade of post-accelerating drum 9. Second control signal $S_2$ is transmitted to adjusting device 30 to adjust the position of post-accelerating drum 9 in the conveyor chute, by way of which the gap is adjusted. Third control signal $S_3$ is sent to the drive or a gearbox 31 of post-accelerating drum 9 to adjust the speed of post-accelerating drum 9, and fourth control signal $S_4$ is sent to an air flap adjusting device 32 to automatically control the air supply.

In the manner according to the present invention, it can be ensured that the forage harvester attains the most economical working output possible by virtue of the fact that the act of transferring—which was previously carried out with an unnecessary amount of energy expenditure—is now carried out in a particularly energy-efficient manner.

Control unit 21 can be designed, e.g., in the form of software on a suitable microcontroller. It is clear that control signals $S_1$, $S_2$, $S_3$, $S_4$ sent by control unit 21 may also need to be adapted to particular adjusting devices 29, 30, 31, 32, e.g., they may need to be converted from a digital form to an analog form. The same can apply for signals $P_1$, $P_2$, $P_3$, NP, CS, HD, EF, SL, ET coming from sensors 22, 23, 24, 25, 26, 27, 28 and user interface 3, which can be converted, e.g., from an analog form to a digital form. The devices required for this are not shown in FIG. 4, however, to prevent the illustration from becoming overly complex. They can be part of control unit 21 or part of user interface 3 or of individual adjusting devices 29, 30, 31, 32 or sensors 22, 23, 24, 25, 26, 27, 28. They can also be separate units, each of which is connected between user interface 3 and sensors 22, 23, 24, 25, 26, 27, 28 and adjusting devices 29, 30, 31, 32 and control unit 21.

Other working units and adjusting devices on harvesting machine 1 can also be controlled using control unit 21, e.g., chopper drum 6 or conditioning device 8. That is, control unit 21 shown can also be combined with a typical control unit that serves to control these working units. This makes sense since some of the same measurement data are required to regulate working units 6, 8 as are required to control—in the manner according to the present invention—the post-acceleration, and, by using a combination of controls for the individual units, it can be ensured that all units are well-coordinated with each other and that the efficiency of the total system is enhanced even further.

For safety reasons, the system is designed such that the driver can manually override one or all of the machine parameters that were set, at any time during a harvesting operation. Finally, it is pointed out once more that the forage harvester shown in the figures, and the control and the specific method described in conjunction therewith are merely exemplary embodiments that could be modified in a variety of ways by one skilled in the art, without leaving the framework of the present invention.

It will be understood that each of the elements described above, or two or more together, may also find a useful application in other types of methods and constructions differing from the types described above.

While the invention has been illustrated and described as embodied in a method for transferring crop material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in appended claims:

1. A method for transferring crop material from a harvesting machine to a hauling vehicle, comprising:
    accelerating the crop material using a post-accelerating device and ejecting the accelerated crop material through a conveyor chute of a transfer device to a target point on a transport vehicle; and
    controlling the acceleration of the crop material to be transferred through the conveyor chute using a control unit, the control unit programmed to control the post accelerating device as a function of two or more parameters that represent a varying transfer distance for optimal energy efficiency.

2. A method as defined in claim 1; and further comprising post-accelerating the crop material to be transferred in a feed device located downstream from a material processing device; and controlling the feed device as a function of the at least one parameter which represents the varying transfer distance.

3. A method as defined in claim 2; wherein the post-accelerating device is located in said conveyor chute.

4. A method as defined in claim 3; and further comprising controlling the acceleration of the crop material achieved via the post-accelerating device by adjusting a parameter selected from the group consisting of a rotary speed, a gap width, an impeller blade setting, an air supply of the post-accelerating device, and a combination thereof.

5. A method as defined in claim 1; and further comprising controlling the acceleration of the crop material by controlling at least one parameter selected from the group consisting of a parameter of the material processing device, a parameter of a conditioning device of the harvesting machine, and both, with consideration of the two or more parameters which represent the varying transfer distance.

6. A method as defined in claim 5, wherein said controlling includes controlling at least one parameter of the material processing device configured as a chopper drum.

7. A method as defined in claim 1; and further comprising controlling the acceleration of the crop material as a function of variables selected from the group consisting of harvesting parameters, crop properties, and both.

8. A method as defined in claim 1; and further comprising locating at least part of the conveyor chute on the harvesting machine; and controlling an acceleration of the crop material as a function of a position of a related part of the conveyor chute.

9. A method as defined in claim 1; and further comprising including in the conveyor chute a movably located discharge flap on a discharge end; and controlling the acceleration of the crop material as a function of a position of the discharge flap.

10. A control unit for a harvesting machine, comprising:
a transfer device for transferring crop material from the harvesting machine to a transport vehicle;
a post-accelerating device for accelerating the crop material and ejecting the accelerated crop material through a conveyor chute of the transfer device to a target point on the transport vehicle; and
wherein said control unit is programmed to control the post-accelerating device such that an acceleration of the crop material to be transferred through the conveyor chute is controlled as a function of two or more parameters that represent a varying transfer distance for optimal energy efficiency.

11. A harvesting machine, comprising:
a transfer device;
a control unit including the transfer device for transferring crop material from the harvesting machine to a transport vehicle;
a post-accelerating device for accelerating the crop material and ejecting the accelerated crop material through a conveyor chute of the transfer device to a target point on the transport vehicle; and
wherein said control unit is programmed to control the post-accelerating device such that an acceleration of the crop material to be transferred through the conveyor chute is controlled as a function of two or more parameters that represent a varying transfer distance for optimal energy efficiency.

12. A harvesting machine as defined in claim 11, wherein the harvesting machine is configured as a forage harvester.

\* \* \* \* \*